(12) United States Patent
Mitsui et al.

(10) Patent No.: US 6,489,439 B2
(45) Date of Patent: Dec. 3, 2002

(54) PRODUCTION PROCESS OF POLYPHENYLENE ETHER

(75) Inventors: Akira Mitsui, Chiba (JP); Yuji Takeda, Mie (JP)

(73) Assignees: Asahi Kasei Kabushiki Kaisha, Osaka (JP); Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 09/883,388

(22) Filed: Jun. 19, 2001

(65) Prior Publication Data

US 2002/0010314 A1 Jan. 24, 2002

(30) Foreign Application Priority Data

Jun. 19, 2000 (JP) .......................... 2000-183145

(51) Int. Cl.$^7$ .................. C08G 65/44; C08G 65/38; C08F 6/08
(52) U.S. Cl. ............. 528/561; 528/492; 528/483; 528/86; 528/215; 528/217; 502/165
(58) Field of Search ........................ 528/501, 492, 528/483, 86, 215, 217; 502/165

(56) References Cited

U.S. PATENT DOCUMENTS

| | | | | |
|---|---|---|---|---|
| 3,988,297 A | * | 10/1976 | Bennett et al. | 260/47 ET |
| 4,028,341 A | * | 6/1977 | Hay | 260/47 ET |
| 4,042,564 A | * | 8/1977 | Bennett et al. | 260/47 ET |
| 4,059,568 A | * | 11/1977 | Copper | 260/47 ET |
| 4,385,167 A | * | 5/1983 | Floryan | 528/215 |
| 4,477,651 A | * | 10/1984 | White et al. | 528/215 |
| 4,588,806 A | * | 5/1986 | Aycock et al. | 528/215 |

* cited by examiner

*Primary Examiner*—Duc Truong
(74) *Attorney, Agent, or Firm*—Birch, Stewart, Kolasch & Birch, LLP

(57) ABSTRACT

A process for producing a polyphenylene ether by oxidative polymerization of a phenol compound using a catalyst and an oxygen-containing gas, wherein the catalyst comprises a copper compound, a bromine compound, a diamine compound represented by the following formula (1):

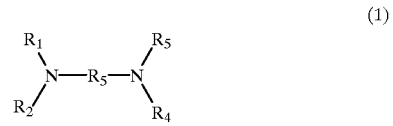

(1)

(wherein, $R_1$, $R_2$, $R_3$ and $R_4$ each independently represents hydrogen or a $C_{1-6}$ linear or branched alkyl group with the proviso that all of them do not represent hydrogen simultaneously, and $R_5$ represents a linear or methyl-branched $C_{2-5}$ alkylene group), a tertiary monoamine compound and a secondary monoamine compound, wherein the process comprises the steps of: controlling an absolute pressure at a gaseous phase of a reaction vessel to a range of from 0.098 MPa to less than 0.392 MPa; and feeding the oxygen-containing gas to the reaction vessel, the oxygen-containing gas having an oxygen partial pressure, in terms of an absolute pressure, of from 0.0147 MPa to 0.0883 MPa.

6 Claims, No Drawings

PRODUCTION PROCESS OF POLYPHENYLENE ETHER

FIELD OF THE INVENTION

The invention relates to a process for actualizing efficient production of a polyphenylene ether.

BACKGROUND OF THE INVENTION

When a polyphenylene ether is obtained by reacting a phenol compound with oxygen in the presence of a catalyst, water which is the final reductant of oxygen is generated by polymerization. This water often induces hydrolysis of the catalyst and reduces its activity, which disturbs an increase in the molecular weight of the polyphenylene ether. Several proposals have been made for keeping the activity of the catalyst. The first proposal for maintaining activity while retaining water in the system is to use a quaternary ammonium salt as described in JP-B-59-22736 (The term "JP-B" as used herein means an "examined Japanese patent publication") or U.S. Pat. No. 4,042,564. Use of such an additive increases a cost, though its amount is not so large. The second proposal is to solubilize water by using a solvent which has compatibility therewith. This process is well known in the art. As the solvent, methanol is often employed. The polyphenylene ether obtained using a solvent system composed solely of methanol has however too low molecular weight to draw attentions as an industrial product. Since the solvent, such as methanol, having compatibility with water is often a poor solvent for a polyphenylene ether, precipitation of it occurs while its molecular weight is still low. Thus, the molecular weight cannot be increased as is expected. A polyphenylene ether is therefore often produced in a mixed solvent system containing a solvent having compatibility with the polyphenylene ether. This however requires complex solvent-collecting equipment. The third proposal is to impart the catalyst itself with water resistance. A process slightly improved in water resistance of the catalyst can be found in U.S. Pat. Nos. 4,028,341, 4,092,294 or 4,788,277, but in such a process, the catalyst has not yet acquired complete water resistance. For discharging water out of the system, conventionally employed are (most of them are well known in the art) addition of a dehydrating agent such as magnesium sulfate to a polymer mixture, use of molecular sieves, and the like (JP-B-44-27831). By removing water, the activity of the catalyst can be maintained. In U.S. Pat. No. 4,477,649, described is removal of water by centrifugal separation or decantation after a desired conversion ratio is attained by continuous polymerization of a polyphenylene ether and in Example 1 of this publication, supplementation of a catalyst component after centrifugal separation of reaction water is described. Although such a process is effective for raising the molecular weight of a polyphenylene ether, it is accompanied with such a drawback that a loss of the catalyst component caused by discarding of it upon centrifugation of reaction water must be made up for and this increases the cost. Particularly in the polymerization using a solvent having no compatibility with water, induction of phase separation of water is most important, but it has not yet been fully attained.

SUMMARY OF THE INVENTION

An object of the present invention is to provide an effective removing method of water generated upon production of a polyphenylene ether by reacting oxygen with a phenol compound in the presence of a catalyst, thereby providing a highly efficient production process of the polyphenylene ether.

Other objects and effects of the present invention will become apparent from the following description.

The present inventors carried out an extensive investigation with a view to overcoming the above-described problems. As a result, to their surprise, it was found that in the production process of a polyphenylene ether by using a specific catalyst, marked advantages are brought about by controlling the absolute pressure of the reaction system, oxygen partial pressure of the feed gas and oxygen concentration of the feed gas, thus leading to the completion of the invention.

That is, the above-described objects of the present invention have been achieved by providing the following production processes.

1) A process for producing a polyphenylene ether by oxidative polymerization of a phenol compound using a catalyst and an oxygen-containing gas, wherein the catalyst comprises a copper compound, a bromine compound, a diamine compound represented by the following formula (1):

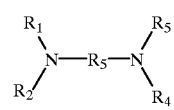

(wherein, $R_1$, $R_2$, $R_3$ and $R_4$ each independently represents hydrogen or a $C_{1-6}$ linear or branched alkyl group with the proviso that all of them do not represent hydrogen simultaneously, and $R_5$ represents a linear or methyl-branched $C_{2-5}$ alkylene group), a tertiary monoamine compound and a secondary monoamine compound, wherein the process comprises the steps of:

controlling an absolute pressure at a gaseous phase of a reaction vessel to a range of from 0.098 MPa to less than 0.392 MPa; and feeding the oxygen-containing gas to the reaction vessel, the oxygen-containing gas having an oxygen partial pressure, in terms of an absolute pressure, of from 0.0147 MPa to 0.0883 MPa.

2) The process according to item 1) above, wherein the oxygen-containing gas has an oxygen concentration of not greater than 21 vol. %.

3) The process according to item 1) above, wherein the oxygen-containing gas has an oxygen concentration of not greater than 11.6 vol. %.

4) The process according to any one of items 1) to 3) above, wherein the phenol compound is charged, at such a rate that charging of the whole amount thereof is completed within a period of from 10 minutes to less than 110 minutes, into the reaction vessel containing the catalyst components and being fed with the oxygen-containing gas.

5) The process according to item 4) above, wherein the oxygen-containing gas is fed at a rate ranging from 0.5 Nl/min to 15 Nl/min with respect to 1 kg of the reaction mixture at which the whole amount of the phenol compound is charged completely.

With the features as described in items 2) to 4) above, further desirable results can be obtained in the present invention.

DETAILED DESCRIPTION OF THE PRESENT INVENTION

The invention is described in more detail below.

The phenol compound to be used in the invention is a compound having a structure represented by the following formula (2):

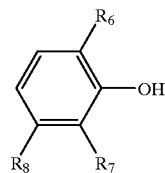

(2)

(wherein, $R_6$ represents an alkyl, substituted alkyl, aralkyl, substituted aralkyl, aryl, substituted aryl, alkoxy or substituted alkoxy group, $R_7$ represents, in addition to those described for $R_6$, a halogen atom, and $R_8$ represent, in addition to those described for $R_7$, hydrogen). Examples of such a compound include 2,6-dimethylphenol, 2,3,6-trimethylphenol, 2-methyl-6-ethylphenol, 2,6-diethylphenol, 2-ethyl-6-n-propylphenol, 2-methyl-6-chlorophenol, 2-methyl-6-bromophenol, 2-methyl-6-isopropylphenol, 2-methyl-6-n-propylphenol, 2-ethyl-6-bromophenol, 2-methyl-6-n-butylphenol, 2,6-di-n-propylphenol, 2-ethyl-6-chlorophenol, 2-methyl-6-phenylphenol, 2,6-diphenylphenol, 2,6-bis-(4-fluorophenyl) phenol, 2-methyl-6-tolylphenol and 2,6-ditolylphenol. They may be used either singly or in combination. Incorporation thereto of a small amount of phenol, o-cresol, m-cresol, p-cresol, 2,4-dimethylphenol or 2-ethylphenol does not cause any substantial problem. Above all of these phenol compounds, 2,6-dimethylphenol is industrially important.

As a catalyst to be used upon production of a polyphenylene ether by oxidative polymerization of a phenol compound by using a catalyst and an oxygen-containing gas, a catalyst system comprising a copper compound, a bromine compound, a diamine compound represented by the following formula (1):

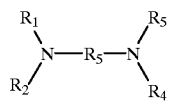

(1)

(wherein, $R_1$, $R_2$, $R_3$ and $R_4$ each independently represents hydrogen or a $C_{1-6}$ linear or branched alkyl group with the proviso that they do not represent hydrogen simultaneously, and $R_5$ represents a linear or methyl-branched $C_{2-5}$ alkylene group), a tertiary monoamine compound and a secondary monoamine compound must be used. It was found that in the production process using this catalyst, remarkable activity improving effects are brought about within a pressure range and oxygen partial pressure range as specified by the present invention. This phenomenon is so surprising as to exceed usual expectation.

Examples of the copper compound and of the bromine compound for use in the present invention are enumerated below.

As the copper compound, a cuprous compound and a cupric compound and a mixture thereof can be used.

Examples of the cuprous compound include cuprous oxide, cuprous chloride, cuprous bromide, cuprous sulfate and cuprous nitrate, while those of the cupric compound include cupric chloride, cupric bromide, cupric sulfate and cupric nitrate. Among them, cuprous oxide, cuprous chloride, cupric chloride, cuprous bromide and cupric bromide are preferred. These copper salts may be obtained upon use by the synthesis of an oxide, carbonate or hydroxide of copper and a corresponding halogen or acid. For example, such a copper salt is available by mixing cuprous oxide and hydrogen bromide (aqueous solution thereof). As the copper compound, cuprous compounds are particularly preferred. These copper compounds may be used either singly or in combination.

Examples of the bromine compound include hydrogen bromide, sodium bromide, potassium bromide, tetramethylammonium bromide and tetraethylammonium bromide. These compounds may be used as an aqueous solution or a solution in a suitable solvent. These bromine compounds may be used singly or in combination.

The most preferred combination of the copper compound and the bromine compound is that of cuprous oxide and an aqueous solution of hydrogen bromide. Although no particular limitation is imposed on the amount of them, they are used so that bromine atom is at least 2 times the mole but not greater than 10 times the mole of copper atom and copper atom falls within a range of 0.02 to 0.6 mole based on 100 moles of the phenol compound.

Examples of the secondary monoamine compound include dimethylamine, diethylamine, di-n-propylamine, di-i-propylamine, di-n-butylamine, di-i-butylamine, di-t-butylamine, dipentylamines, dihexylamines, dioctylamines, didecylamines, dibenzylamines, methylethylamine, methylpropylamine, methylbutylamine and cyclohexylamine. Examples of the N-(substituted or unsubstituted phenyl)alkanolamine include N-phenylmethanolamine, N-phenylethanolamine, N-phenylpropanolamine, N-(m-methylphenyl)ethanolamine, N-(p-methylphenyl) ethanolamine, N-(2',6'-dimethylphenyl)ethanolamine and N-(p-chlorophenyl)ethanolamine. Examples of the N-(hydrocarbon-substituted)aniline include N-ethylaniline, N-butylaniline, N-methyl-2-methylaniline, N-methyl-2,6-dimethylaniline and diphenylamine. These secondary monoamine compounds are however not limited to these examples. They may be used either singly or in combination. Although no particular limitation is imposed on the amount, it is usually added in an amount ranging from 0.05 to 15 moles based on 100 moles of the phenol compound.

The diamine compound to be used in the invention has a structure represented by the following formula (1):

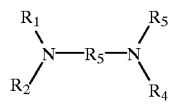

(1)

wherein $R_1$, $R_2$, $R_3$ and $R_4$ each independently represents hydrogen or a $C_{1-6}$ linear or branched alkyl group, with the proviso that they do not represent a hydrogen atom at the same time, and $R_5$ represents a $C_{2-5}$ linear or methyl-branched alkylene group).

Among the diamine compounds having the above-described structure, N,N'-di-t-butylethylenediamine is preferred. Although no particular limitation is imposed on the amount of the diamine compound, it is preferably added in an amount of at least 0.5 time the mole of the copper atom to be ordinarily used. The upper limit is not critical.

As the tertiary monoamine compound, aliphatic tertiary amines including alicyclic tertiary amines can be used.

Examples include trimethylamine, triethylamine, tripropylamine, tributylamine, triisobutylamine, dimethylethylamine, dimethylpropylamine, allyldiethylamine, dimethyl-n-butylamine, diethylisopropylamine and N-methylcyclohexylamine. These tertiary monoamines may be used either singly or in combination. Although no particular limitation is imposed on the amount of it, an amount ranging from 0.1 to 15 moles relative to 100 moles of the phenol compound is preferred.

Although there is no particular limitation imposed on the nature of the solvent to be used in the invention insofar as it is not easily oxidized compared with the monomer to be oxidized and at the same time, has almost no reactivity with various radicals which are presumed to be formed during reaction, those permitting dissolution therein a low-molecular-weight phenol compound and also a portion or whole of the catalyst mixture. Examples of such a solvent include aromatic hydrocarbons such as benzene, toluene, xylene and ethylbenzene, hydrocarbon halides such as chloroform, methylene chloride, 1,2-dichloroethane, trichloroethane, chlorobenzene, dichlorobenzene and trichlorobenzene; and nitro compounds such as nitrobenzene. They may be used as a good solvent for the polymer. Examples of the poor solvent for the polymer include aliphatic hydrocarbons such as pentane, hexane, heptane, cyclohexane and cycloheptane and ethers such as tetrahydrofuran and diethyl ether.

A solvent having compatibility with water can be mixed in an amount not disturbing the advantages of the present invention. Examples of such a solvent include alcohols such as methanol, ethanol and propanol, ketones such as acetone and methyl ethyl ketone, esters such as ethyl acetate and ethyl formate, amides such as dimethylformamide and sulfoxides such as dimethylsulfoxide. These solvents may be used singly or if necessary, as a mixture.

The solvent to be used in the present invention exhibits particularly desirable activity under the conditions substantially free of compatibility with water. Aromatic hydrocarbon solvents such as toluene and xylene are frequently employed as a solvent.

The polymerization method becomes solution polymerization at a specific ratio of good solvent to poor solvent for a polyphenylene ether which is a polymer available by oxidative polymerization of a phenol compound. At an increased ratio of a poor solvent, on the other hand, the method becomes precipitation polymerization wherein the polymer is precipitated as particles in the reaction solvent with the progress of the reaction.

The invention is attained by using the above-described catalyst, controlling the absolute pressure at the gaseous phase portion of the reaction vessel to a range of from 0.098 MPa (mega pascal) to less than 0.392 MPa, and feeding a reaction vessel with an oxygen-containing gas having an oxygen partial pressure, in terms of an absolute pressure, of from 0.0147 MPa to 0.0883 MPa.

The oxygen concentration range of the oxygen-containing gas to be used in the invention is defined by the absolute pressure at the gaseous phase portion of the reaction vessel and oxygen absolute partial pressure of the oxygen-containing gas. In the present invention, when the absolute pressure at the gaseous phase portion of the reaction vessel is controlled to a range of from 0.098 MPa (mega pascal) to less than 0.392 MPa, the partial pressure of oxygen contained in the oxygen-containing gas fed to the reaction vessel must be from 0.0147 MPa to 0.0883 MPa in terms of an absolute pressure. The calculation formula for attaining such a state will next be described. Supposing that the absolute pressure at the gaseous phase portion of the reaction vessel is A(MPa), A falls within a range of $0.098 \leq A < 0.392$. The lower limit of the oxygen concentration in the oxygen-containing gas is represented by $[(0.0147/A) \times 100]$ (%), while the upper limit of it is represented by $[(0.0883/A) \times 100]$ (%). When the oxygen concentration is high, an inert gas must be introduced to the gaseous phase portion of the reaction vessel for safety. At this time, the higher the oxygen concentration of the oxygen-containing gas, the greater the amount of the inert gas to be introduced. It is therefore necessary to determine the upper limit of the oxygen concentration in consideration of an economical aspect. An oxygen concentration of 21 vol. % or less is preferred. Oxygen concentrations not greater than this value can improve the cost because the amount of an inert gas to be introduced into the gaseous phase portion of the reaction vessel can be decreased largely. Oxygen concentrations of 11.6 vol. % or less being more preferred and within this, safety is essentially ensured. Absolute pressures of 0.392 MPa or greater at the gaseous phase portion of the reaction vessel are not preferred, because they need inappropriately large equipment.

As the oxygen-containing gas in the invention, usable is that prepared by mixing oxygen and an inert gas to give its oxygen concentration within the range of the invention, air or a mixture of air and an inert gas. As the inert gas, any inert gas can be used insofar as it has not a large influence on the polymerization reaction. Nitrogen is the typical example of it.

The polymerization, feeding of the oxygen-containing gas and treatment of an unreacted gas can usually be carried out as follows: The absolute pressure at the gaseous phase portion in the reaction vessel having therein a catalyst mixture is adjusted to a range of from 0.098 MPa (mega pascal) to less than 0.392 MPa by introducing a gas (ex. inert gas or air-oxygen-containing gas, or mixture thereof). Gas-liquid mixing is then conducted by introducing an oxygen-containing gas having an oxygen partial pressure, in terms of an absolute pressure, of from 0.0147 MPa to 0.0883 MPa from a sparger attached at the bottom of the reaction vessel and stirring the mixture in the reaction vessel by an agitating element. When the oxygen concentration is 11.6% or greater, the gaseous phase portion is purged with nitrogen for safety. Polymerization reaction is then initiated by adding the phenol compound (or a solution having the phenol compound dissolved therein) to the reaction vessel through a pump. The gas-flow mixture discharged from the reaction vessel is cooled and condensed by a cooler disposed on the upper part of the reaction vessel. The condensate is introduced into a decanter, where it is separated into a water phase and an organic phase. The organic phase thus separated is returned back to the reaction vessel. The pressure of the reaction vessel is controlled by a control valve disposed downstream of the cooler. It is also possible to measure the oxygen concentration in the gas discharged from the cooler, mix the gas with oxygen, air or an inert gas, thereby controlling the oxygen concentration and absolute pressure to fall within the range of the invention, and then circulate the mixture to the sparger at the bottom of the reaction vessel. This makes it possible to decrease the amount of the mixture to be discharged to the environment and is therefore preferred. In the above-described operation, although no particular limitation is imposed on the addition rate of the phenol compound, a rate permitting completion of the charging of the whole amount within a period of from 10 minutes to less than 100 minutes is preferred. It is also possible to charge a portion of the phenol compound in the reaction vessel before introduction and feeding of the oxygen-containing gas and add the remaining portion at any time later or to charge in the reaction vessel the whole amount of the phenol compound in advance. In this case, the time when the oxygen-containing gas is introduced is regarded as the reaction starting point.

Although there is no particular limitation imposed on the introduction rate of the oxygen-containing gas, the feeding rate with respect to 1 kg of the reaction mixture at which charging of the whole amount of the phenol compound is completed preferably ranges from 0.5 Nl/min to 15 Nl/min. This amount is not critical, but at an excessively small amount, it takes long time to attain a desired molecular weight, thereby deteriorating productivity. Excessively large amounts, on the other hand, induce enlargement of equipment or increase of an exhaust gas amount so they are economically disadvantageous. During polymerization, the introduction rate can be changed. Favorable results are sometimes available by suppressing the introduction rate in the former stage of polymerization and by increasing it in the latter stage.

In the present invention, incorporation of a tetraalkylammonium salt compound, polyethylene-glycol-containing alkylamine or polyethylene-glycol-containing alkyl ammonium salt compound in the whole mixture charged in the reaction vessel in an amount not exceeding 0.1 wt. % is preferred for further improving the action of the invention, but it is not always necessary. Such a compound has a structure represented by the following formula (3), (4) or (5):

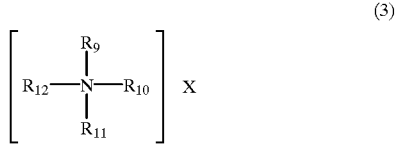
(3)

(wherein $R_9$, $R_{10}$, $R_{11}$ and $R_{12}$ each independently represents a $C_{1-22}$ linear or branched alkyl group and X represents a counter anion);

(4)

(wherein $R_{13}$ represents a $C_{1-22}$ linear or branched alkyl group, $R_{14}$ represents, in addition to those described for $R_{13}$, a group represented by —$(CH_2CH_2O)_n$—H (n stands for an integer of 1 to 40), and $R_{15}$ is a group represented by —$(CH_2CH_2O)_n$—H (n stands for an integer of 1 to 40));

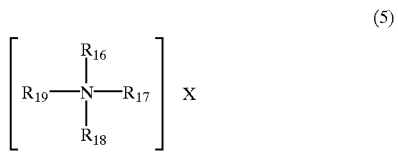
(5)

(wherein $R_{16}$ and $R_{17}$ each independently represents a $C_{1-22}$ linear or branched alkyl group, $R_{18}$ represents, in addition to those described for $R_{16}$, a group represented by —$(CH_2CH_2O)_n$—H (n stands for an integer of 1 to 40), $R_{19}$ is a group represented by —$(CH_2CH_2O)_n$—H (n stands for an integer of 1 to 40)), and X is a counter anion).

The typical examples of such a compound include trioctylmethylammonium chloride known as a trade name of Aliquat 336 (product of Henkel KGaA) or Capriquat (product of Dojindo Laboratories). They are preferred in the present invention.

Polymerization is preferably effected at a temperature ranging from 0 to 80° C., more preferably 10 to 60° C., because reaction does not proceed smoothly at an excessively low temperature, while the catalyst happens to be deactivated at an excessively high temperature. Favorable results tend to be available by setting the temperature a little lower in the former stage of polymerization and a little higher in the latter stage of polymerization.

Reaction is terminated when the molecular weight reaches a desired value, because the molecular weight of the polymer is apparent from the viscosity of the polymer solution measured during polymerization or by the analysis of the sampled polymer.

No particular limitation is imposed on the treatment after completion of the polymerization reaction. A polyphenylene ether can usually be collected simply by adding an acid such as hydrochloric acid or acetic acid, ethylenediaminetetraacetic acid (EDTA) or salt thereof, or nitrilotriacetic acid or salt thereof to the reaction mixture to deactivate the catalyst, separating the resulting polymer from the reaction mixture, washing it with a solvent such as methanol which does not dissolve therein the polymer and then drying.

EXAMPLES

The invention will hereinafter be described more specifically by examples wherein 2,6-dimethylphenol was used as the phenol compound; and with regards to the catalyst component, cuprous oxide was used as the copper compound, hydrogen bromide (in the form of an aqueous solution) as the bromine compound, N,N'-di-t-butylethylenediamine (which will hereinafter be abbreviated as "Dt") as the diamine compound, N,N-di-n-butylamine (which will hereinafter be abbreviated as "DBA") as the secondary monoamine compound, N,N-dimethyl-n-butylamine (which will hereinafter be abbreviated as "BD") as the tertiary monoamine, and, if necessary, trioctylmethylammonium chloride (which will hereinafter be abbreviated as "TOM") as the tetraalkylammonium salt. It should however be borne in mind that the invention is not limited to or by these examples.

The viscosity (ηsp/c) of a polyphenylene ether was measured at 30° C. as a chloroform solution having a concentration of 0.5 g/100 ml by using an Ubbelohde's viscometer. The unit is expressed by dl/g.

Procedures generally employed in each of examples and comparative examples will next be described.

In a 10-liter jacketed autoclave reactor having, at its bottom, a sparger for introducing an oxygen-containing gas, an agitating turbine element and a baffle; and having, at a vent gas line at the upper portion of the reactor, a reflux condenser having a condensate-separating decanter attached to the bottom, the catalyst components and a portion of toluene are charged. Vigorous stirring is started, followed by introduction of the oxygen-containing gas from the sparger in accordance with each of Examples and Comparative examples. When the oxygen-containing gas to be fed to the reactor has a high oxygen concentration, nitrogen is introduced into the gaseous phase portion for safety. The pressure inside of the reactor is adjusted by a control valve disposed downstream of the reflux condenser. Addition of a toluene solution having 2,6-dimethylphenol dissolved therein is started at a rate in accordance with each of Examples and Comparative examples. This time point is designated as a polymerization initiation time. The amount at the time when the addition of the 2,6-dimethylphenol solution is completed is designated as the calculated amount (charged amount) based on the whole charged mixture. The charged amount is set at 5 kg in all the examples and comparative examples. The feeding rate of the oxygen-containing gas will hereinafter be defined as a value obtained by dividing by 5 the actual feeding rate to the reactor, that is, a feeding rate (unit: Nl/min·kg) per kg of the calculated amount based on the whole charged mixture. In order to describe the examples of the present invention while comparing them, charged amounts are common in the below-described examples and some of the comparative examples. Added are 1100 g of 2,6-dimethylphenol, 3827.2 g of toluene, 1.4172 g of cuprous oxide, 8.5243 g of a 47% aqueous solution of hydrogen bromide, 3.4139 g of Dt, 41.9196 g of BD, 16.5277 g of DBA and if necessary, 1.00 g of TOM. The total amount is 5 kg. In the other comparative examples, the total amount is also 5 kg, but the catalyst employed is different. At any time during polymerization, a small amount of the reaction mixture is sampled using a sampling pot. An aqueous solution of tetrasodium salt of EDTA is added thereto, followed by stirring. By the addition of an equal volume of methanol, a polymer is precipitated. The polymer thus precipitated is filtered and the filtrate is washed three times with methanol and then dried under vacuum at 145° C. for 1 hour. The $\eta$sp/c of the dried polymer is measured. From the curve of $\eta$sp/c relative to the polymerization time, time to attain a desired $\eta$sp/c from the initiation of polymerization is found and it is determined as a necessary time. The desired $\eta$sp/c is set at 0.75 dl/g. After completion of the polymerization, the amount of water generated by polymerization and trapped in the decanter is measured, whereby a water removing efficiency is determined. The water removing efficiency is a ratio, expressed by %, of water trapped in the decanter to a stoichiometric water generation amount.

Example 1

In the reactor as described in the general procedure, a first charge liquid was prepared by charging in the reactor 1.4172 g of cuprous oxide, 8.5243 g of a 47% aqueous solution of hydrogen bromide, 16.5277 g of DBA, 41.9196 g of BD, 3.4139 g of Dt and 2770.3 g of toluene. Since an oxygen-containing gas to be fed to the reactor was too high, nitrogen was introduced into the gaseous phase portion of the reaction vessel to control the absolute pressure of the gaseous portion of the reaction vessel to 0.108 MPa. A gas which had been prepared by diluting oxygen with nitrogen and had an absolute pressure of 0.108 MPa and an oxygen concentration of 70% (accordingly, the oxygen partial pressure in terms of an absolute pressure (which will hereinafter be called "absolute partial pressure of oxygen") in this case was 0.108 MPa×0.7=0.0756 MPa was introduced from the sparger. Then, also during polymerization, nitrogen was introduced to the gaseous phase portion of the reaction vessel and the control valve was controlled so that the absolute pressure at the gaseous phase portion of the reaction vessel would be maintained at 0.108 MPa by nitrogen and the above-described gas. The above-described gas was introduced at a rate of 0.69 Nl/min·kg into 1 kg of the mixture, that is, the calculated amount based on the whole charged mixture (in this case, since the amount of the whole charged mixture was 5 kg, the amount introduced practically was 0.69×5=3.45 Nl/min). Rightly after the starting of the gas feeding, a solution obtained by dissolving 1100 g of 2,6-dimethylphenol in 1056.9 g of toluene was added using a plunger pump at such a rate that the charging of the whole amount was completed in 30 minutes. The polymerization temperature was kept at 40° C. by feeding a heat transfer medium through the jacket. After the polymer solution became a little viscous, sampling of it in a small amount was started. The necessary time (that is, polymerization time necessary for $\eta$sp/c to reach 0.75 dl/g from the initiation of the polymerization) was determined by measuring $\eta$sp/c. The results are shown in Table 1.

Comparative Example 1

In a similar manner to Example 1 except that the pressure at the gaseous phase portion of the reaction vessel was controlled to 0.152 MPa in terms of an absolute pressure (accordingly, the absolute pressure of the oxygen-containing gas became 0.152 MPa and the absolute partial pressure of oxygen became 0.1064 MPa), polymerization and measurement were conducted. The results are shown in Table 1.

Example 2

In a similar manner to Example 1 except that the pressure at the gaseous phase portion of the reaction vessel was controlled to 0.181 MPa in terms of an absolute pressure by introducing the oxygen-containing gas having an absolute pressure of 0.181 MPa and an oxygen concentration of 40% (accordingly, the absolute partial pressure of oxygen of the oxygen-containing gas was 0.0724 MPa); and the oxygen-containing gas was fed at a rate of 1.21 Nl/min·kg, polymerization and measurement were conducted. The results are shown in Table 1.

Comparative Example 2

In a similar manner to Example 2 except that the pressure at the gaseous phase portion of the reaction vessel was controlled to 0.250 MPa in terms of an absolute pressure (accordingly, the absolute pressure of the oxygen-containing gas became 0.250 MPa and the absolute partial pressure of oxygen became 0.100 MPa), polymerization and measurement were conducted. The results are shown in Table 1.

Example 3

In a similar manner to Example 1 except that air was used as the oxygen-containing gas; the pressure at the gaseous phase portion of the reaction vessel was controlled to 0.103 MPa in terms of an absolute pressure (accordingly, the absolute pressure of the oxygen-containing gas became 0.103 MPa and the absolute partial pressure of oxygen became 0.0216 MPa); and the air was fed at a rate of 2.31 Nl/min·kg, polymerization and measurement were conducted. The results are shown in Table 1.

Example 4

In a similar manner to Example 1 except that the pressure at the gaseous phase portion of the reaction vessel was controlled to 0.250 MPa in terms of an absolute pressure (accordingly, the absolute pressure of the oxygen-containing gas became 0.250 MPa and the absolute partial pressure of oxygen became 0.0525 MPa), polymerization and measurement were conducted. The results are shown in Table 1.

Comparative Example 3

In a similar manner to Example 3 except that pure oxygen was used as the oxygen-containing gas and oxygen was fed at a rate of 0.50 Nl/min·kg, polymerization and measurement were conducted. The results are shown in Table 1.

Comparative Example 4

In a similar manner to Comparative Example 3 except that oxygen was fed at a rate of 2.31 Nl/min·kg, polymerization and measurement were conducted. The results are shown in Table 1.

Comparative Example 5

In a similar manner to Example 3 except that the pressure at the gaseous phase portion of the reaction vessel was controlled to 0.500 MPa in terms of absolute pressure (accordingly, the absolute pressure of the oxygen-containing gas became 0.500 MPa and the absolute partial pressure of oxygen became 0.105 MPa), polymerization and measurement were conducted. The results are shown in Table 1.

Example 5

In a similar manner to Example 1 except that the oxygen-containing gas had an oxygen concentration of 11.6%; the pressure at the gaseous phase portion of the reaction vessel was controlled to 0.147 MPa in terms of an absolute pressure (accordingly, the absolute partial pressure of the oxygen-containing gas became 0.147 MPa and the absolute partial pressure of oxygen became 0.0171 MPa); the oxygen-containing gas was fed at a rate of 4.18 Nl/min·kg; and introduction of nitrogen to the gaseous phase portion of the reaction vessel conducted for safety was omitted, polymerization and measurement were conducted. The results are shown in Table 1.

Example 6

In a similar manner to Example 5 except that the pressure at the gaseous phase portion of the reaction vessel was controlled to 0.250 MPa in terms of an absolute pressure (accordingly, the absolute pressure of the oxygen-containing gas became 0.250 MPa and the absolute partial pressure of oxygen became 0.0290 MPa), polymerization and measurement were conducted. The results are shown in Table 1.

Comparative Example 6

In a similar manner to Example 6 except that the pressure at the gaseous phase portion of the reaction vessel was controlled to 0.0981 MPa in terms of an absolute pressure (accordingly, the absolute pressure of the oxygen-containing gas became 0.0981 MPa and the absolute partial pressure of oxygen became 0.0114 MPa), polymerization and measurement were conducted. The results are shown in Table 1.

Comparative Example 7

In a similar manner to Example 6 except that the pressure at the gaseous phase portion of the reaction vessel was controlled to 0.500 MPa in terms of an absolute pressure (accordingly, the absolute pressure of the oxygen-containing gas became 0.500 MPa and the absolute partial pressure of oxygen became 0.058 MPa), polymerization and measurement were conducted. The results are shown in Table 1.

Comparative Example 8

In a similar manner to Comparative Example 7 except that the oxygen-containing gas was fed at a rate of 20.3 Nl/min·kg, polymerization and measurement were conducted. The results are shown in Table 1.

Example 7

In a similar manner to Example 5 except that the oxygen-containing gas had an oxygen concentration of 8.5%; the pressure at the gaseous phase portion of the reaction vessel was controlled to 0.245 MPa in terms of an absolute pressure (accordingly, the absolute partial pressure of the oxygen-containing gas became 0.245 MPa and the absolute partial pressure of oxygen became 0.0208 MPa); and the oxygen-containing gas was fed at a rate of 5.70 Nl/min·kg, polymerization and measurement were conducted. The results are shown in Table 1.

Example 8

In a similar manner to Example 7 except that the pressure at the gaseous phase portion of the reaction vessel was controlled to 0.348 MPa in terms of an absolute pressure (accordingly, the absolute pressure of the oxygen-containing gas became 0.348 MPa and the absolute partial pressure of oxygen became 0.0296 MPa), polymerization and measurement were conducted. The results are shown in Table 1.

Example 9

In a similar manner to Example 8 except that the oxygen-containing gas had an oxygen concentration of 6.0%; the pressure at the gaseous phase portion of the reaction vessel was controlled to 0.348 MPa in terms of an absolute pressure (accordingly, the absolute pressure of the oxygen-containing gas became 0.348 MPa and the absolute partial pressure of oxygen became 0.0208 MPa); and the oxygen-containing gas was fed at a rate of 8.09 Nl/min·kg, the polymerization and measurement were conducted. The results are shown in Table 1.

Comparative Example 9

In a similar manner to Example 9 except that the oxygen-containing gas had an oxygen concentration of 4.0%; the pressure at the gaseous phase portion of the reaction vessel was controlled to 0.348 MPa in terms of an absolute pressure (accordingly, the absolute pressure of the oxygen-containing gas became 0.348 MPa and the absolute partial pressure of oxygen became 0.0139 MPa); and the oxygen-containing gas was fed at a rate of 18.0 Nl/min·kg, the polymerization and measurement were conducted. The results are shown in Table 1.

Example 10

In a similar manner to Example 8 except that the monomer solution was charged at such a rate that the charging was completed in 100 minutes; and the oxygen-containing gas was fed at a rate of 1.70 Nl/min·kg, the polymerization and measurement were conducted. The results are shown in Table 1.

Example 11

In a similar manner to Example 10 except that the oxygen-containing gas was fed at a rate of 13.0 Nl/min·kg, the polymerization and measurement were conducted. The results are shown in Table 1.

Example 12

In a similar manner to Example 10 except that the oxygen-containing gas was fed at a rate of 0.70 Nl/min·kg, the polymerization and measurement were conducted. The results are shown in Table 1.

Example 13

In a similar manner to Example 8 except that the monomer solution was charged at such a rate that the charging was completed in 15 minutes; and the oxygen-containing gas was fed at a rate of 15.0 Nl/min·kg, the polymerization and measurement were conducted. The results are shown in Table 1.

Example 14

After preparation of a catalyst-containing first charge solution in accordance with Example 7, a 215.69 g portion of a solution obtained by dissolving 1100 g of 2,6-dimethylphenol in 1056.9 g of toluene was added. In a similar manner to Example 7 except that the oxygen-containing gas had an oxygen concentration of 8.5%; the pressure at the gaseous phase portion of the reaction vessel was controlled to 0.245 MPa in terms of an absolute pressure (accordingly, the absolute pressure of the oxygen-containing gas became 0.245 MPa and the absolute partial pressure of oxygen became 0.0208 MPa); the oxygen-containing gas was fed at a rate of 5.70 Nl/min·kg, and rightly after that, the remaining portion of the monomer solution was charged at such a rate that charging of it was completed in 30 minutes, the polymerization and measurement were conducted. The results are shown in Table 1.

Example 15

After preparation of a catalyst-containing first charge solution in accordance with Example 14, a solution obtained by dissolving 1100 g of 2,6-dimethylphenol in 1056.9 g of toluene was added (in other words, the whole amounts of 2,6-dimethylphenol and toluene were added prior to the starting of the reaction). In a similar manner to Example 14 except that the oxygen-containing gas had an oxygen concentration of 8.5%; the pressure at the gaseous phase portion of the reaction vessel was controlled to 0.245 MPa in terms of an absolute pressure (accordingly, the absolute pressure of the oxygen-containing gas became 0.245 MPa and the absolute partial pressure of oxygen became 0.0208 MPa); the oxygen-containing gas was fed at a rate of 5.70 Nl/min·kg; and subsequent addition was not conducted, the polymerization and measurement were conducted. The results are shown in Table 1.

Example 16

In a similar manner to Example 3 except that the temperature inside of the reaction vessel was controlled to 40° C. during 90 minutes after the starting of the reaction; and then, it was maintained at 50° C., the polymerization and measurement were conducted. The results are shown in Table 1.

Example 17

In a similar manner to Example 8 except that the temperature inside of the reaction vessel was controlled to 40° C. during 90 minutes after the starting of the reaction, and then, it was maintained at 50° C., the polymerization and measurement were conducted. The results are shown in Table 1.

Example 18

In a similar manner to Example 7 except that the feeding rate of the oxygen-containing gas during 90 minutes after the starting of the reaction was controlled to 5.70 Nl/min·kg and it was then, increased to 9.0 Nl/min·kg, the polymerization and measurement were conducted. The results are shown in Table 1.

Example 19

In a similar manner to each of Examples 1, 3, 5, 7, 14, 17 and 18 except that upon preparation of the catalyst-containing first charge solution, 200 ppm, based on the whole mixture charged, of TOM ("Capriquat", trade name) was added, the polymerization and measurement were conducted. The results are shown in Table 1.

Described below are comparative examples for exhibiting the results of the use of a known catalyst as described in JP-A-57-53531 which catalyst is different from that of the invention.

Comparative Example 10

In a polymerization reactor, 4.51 g of cuprous bromide and 69.39 g of 1,4-dimethylpentylamine were charged, followed by the addition of 6.939 g of 2,6-dimethylphenol. The absolute pressure at the gaseous phase portion of the reaction vessel was controlled to 0.103 MPa. At a rate of 0.345 Nl/min·kg, feeding of oxygen was started. Two minutes later, a solution obtained by dissolving 707.8 g of 2,6-dimethylphenol in 4211.4 g of toluene was charged at such a rate that charging of it was completed in 30 minutes. The reaction temperature during polymerization was maintained at 40° C. To the gaseous phase portion, nitrogen was added for safety. The sampling during polymerization and the like operations were conducted in a similar manner to Example 1. The results are shown in Table 1.

Comparative Example 11

In a similar manner to Comparative Example 10 except that air was used instead of oxygen; the absolute pressure at the gaseous phase portion of the reaction vessel was controlled to 0.25 MPa (accordingly the absolute pressure of the oxygen-containing gas became 0.25 MPa and the absolute partial pressure of oxygen became 0.0525 MPa); and air was fed at a rate of 2.3 Nl/min·kg, the polymerization and measurement were conducted. The results are shown in Table 1.

Comparative Example 12

In a similar manner to Comparative Example 10 except that 33 g of heptylamine was used instead of 1,4-dimethylpentylamine as one of the catalyst components, the polymerization and measurement were conducted. The results are shown in Table 1.

Comparative Example 13

In a similar manner to Comparative Example 11 except that the same composition as in Comparative Example 12 was employed, the polymerization and measurement were conducted. The results are shown in Table 1.

Comparative Example 14

In a similar manner to Comparative Example 10 except that with regards to the catalyst components, the amount of cuprous bromide was changed to 3.6 g and 33 g of nonylamine was used instead of 1,4-dimethylpentylamine, the polymerization and measurement were conducted. The results are shown in Table 1.

Comparative Example 15

In a similar manner to Comparative Example 11 except for the use of the composition as charged in Comparative Example 14, the polymerization and measurement were conducted. The results are shown in Table 1.

Different from the catalyst of the present invention, that used in each of Comparative Examples 10 to 15 must be used in a large amount, which increases the cost and therefore is not economically desirable. From the results of Table 1 (particularly, the results of Comparative Example 15), it is evident that even if the absolute pressure at the gaseous phase portion of the reaction vessel and the absolute partial pressure of oxygen in the oxygen-containing gas were controlled within the range of the present invention, the activity of the catalyst is not improved.

As is apparent from the results of Table 1, it has been understood that when the catalyst of the present invention is employed, a marked improvement in the activity of the catalyst and effective removal of water can be attained by controlling the absolute pressure at the gaseous phase portion of the reaction vessel and absolute partial pressure of oxygen in the oxygen-containing gas within the range of the present invention.

TABLE 1

| Test No. | Absolute pressure in reaction vessel [MPa] | Oxygen concentration (%) | Absolute partial pressure of oxygen [MPa] | Necessary time (min) | Water removing ratio (%) | Example 19 (min) |
|---|---|---|---|---|---|---|
| Example 1 | 0.108 | 70 | 0.0756 | 140 | 23 | 133 |
| Comp. Ex. 1 | 0.152 | 70 | 0.1064 | 165 | 18 | |
| Example 2 | 0.181 | 40 | 0.0724 | 142 | 27 | |
| Comp. Ex. 2 | 0.250 | 40 | 0.1000 | 163 | 15 | |
| Example 3 | 0.103 | 21 | 0.0216 | 140 | 50 | 132 |
| Example 4 | 0.250 | 21 | 0.525 | 135 | 54 | |
| Comp. Ex. 3 | 0.103 | 100 | 0.1030 | 169 | 12 | |
| Comp. Ex. 4 | 0.103 | 100 | 0.1030 | 162 | 15 | |
| Comp. Ex. 5 | 0.500 | 21 | 0.1050 | 172 | 12 | |
| Example 5 | 0.147 | 11.6 | 0.0171 | 140 | 53 | 130 |
| Example 6 | 0.250 | 11.6 | 0.0290 | 120 | 56 | |
| Comp. Ex. 6 | 0.0981 | 11.6 | 0.0114 | Not reached | 20 | |
| Comp. Ex. 7 | 0.500 | 11.6 | 0.0580 | 188 | 16 | |
| Comp. Ex. 8 | 0.500 | 11.6 | 0.0580 | 140 | 42 | |
| Example 7 | 0.245 | 8.5 | 0.0208 | 133 | 60 | 120 |
| Example 8 | 0.348 | 8.5 | 0.0296 | 121 | 58 | |
| Example 9 | 0.348 | 6.0 | 0.0208 | 143 | 63 | |
| Comp. Ex. 9 | 0.348 | 4.0 | 0.0139 | Not reached | 29 | |
| Example 10 | 0.348 | 8.5 | 0.0296 | 120 | 53 | |
| Example 11 | 0.348 | 8.5 | 0.0296 | 118 | 69 | |
| Example 12 | 0.348 | 8.5 | 0.0296 | 123 | 48 | |
| Example 13 | 0.348 | 8.5 | 0.0296 | 125 | 73 | |
| Example 14 | 0.245 | 8.5 | 0.0208 | 120 | 62 | 116 |

TABLE 1-continued

| Test No. | Absolute pressure in reaction vessel [MPa] | Oxygen concentration (%) | Absolute partial pressure of oxygen [MPa] | Necessary time (min) | Water removing ratio (%) | Example 19 (min) |
|---|---|---|---|---|---|---|
| Example 15 | 0.245 | 8.5 | 0.0208 | 120 | 63 | |
| Example 16 | 0.103 | 21 | 0.0216 | 135 | 59 | |
| Example 17 | 0.348 | 8.5 | 0.0296 | 114 | 65 | 109 |
| Example 18 | 0.245 | 8.5 | 0.0208 | 122 | 68 | 117 |
| Comp. Ex. 10 | 0.103 | 100 | 0.1030 | 80 | 9 | The catalysts of Comp. Ex. 10 to 15 differ in kind from that of the present invention. |
| Comp. Ex. 11 | 0.25 | 21 | 0.0525 | 108 | 22 | |
| Comp. Ex. 12 | 0.103 | 100 | 0.1030 | 90 | 10 | |
| Comp. Ex. 13 | 0.25 | 21 | 0.0525 | 135 | 29 | |
| Comp. Ex. 14 | 0.103 | 100 | 0.1030 | 143 | 14 | |
| Comp. Ex. 15 | 0.25 | 21 | 0.0525 | 192 | 32 | |

Upon production of a polyphenylene ether in the present invention by reacting oxygen and a phenol compound in the presence of a catalyst, control of the absolute pressure at the gaseous phase portion of the reaction vessel and the absolute partial pressure of oxygen in the oxygen-containing gas within the range as specified by the present invention makes it possible to remove product water efficiently and improve the activity of the catalyst markedly. Thus, a highly efficient production process of a polyphenylene ether can be attained.

While the invention has been described in detail and with reference to specific examples thereof, it will be apparent to one skilled in the art that various changes and modifications can be made therein without departing from the spirit and scope thereof.

What is claimed is:

1. A process for producing a polyphenylene ether by oxidative polymerization of a phenol compound using a catalyst and an oxygen-containing gas, wherein the catalyst comprises a copper compound, a bromine compound, a diamine compound represented by the following formula (1):

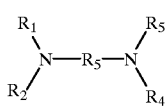

(1)

(wherein, $R_1$, $R_2$, $R_3$ and $R_4$ each independently represents hydrogen or a $C_{1-6}$ linear or branched alkyl group with the proviso that all of them do not represent hydrogen simultaneously, and $R_5$ represents a linear or methyl-branched $C_{2-5}$ alkylene group), a tertiary monoamine compound and a secondary monoamine compound, wherein the process comprises the steps of:
controlling an absolute pressure at a gaseous phase of a reaction vessel to a range of from 0.098 MPa to less than 0.392 MPa; and
feeding the oxygen-containing gas to the reaction vessel, the oxygen-containing gas having an oxygen partial pressure, in terms of an absolute pressure, of from 0.0147 MPa to 0.0883 MPa.

2. The process according to claim 1, wherein the oxygen-containing gas has an oxygen concentration of not greater than 21 vol. %.

3. The process according to claim 1, wherein the oxygen-containing gas has an oxygen concentration of not greater than 11.6 vol. %.

4. The process according to any one of claims 1 to 3, wherein the phenol compound is charged, at such a rate that charging of the whole amount thereof is completed within a period of from 10 minutes to less than 110 minutes, into the reaction vessel containing the catalyst components and being fed with the oxygen-containing gas.

5. The process according to claim 4, wherein the oxygen-containing gas is fed at a rate ranging from 0.5 Nl/min to 15 Nl/min with respect to 1 kg of the reaction mixture at which the whole amount of the phenol compound is charged completely.

6. The process according to any one of claims 1 to 3, wherein the oxygen-containing gas is fed at a rate ranging from 0.5 Nl/min to 15 Nl/min with respect to 1 kg of the reaction mixture at which the whole amount of the phenol compound is charged completely.

* * * * *